July 22, 1958     W. F. DURBIN     2,844,269
CONTAINER

Filed Dec. 13, 1954     2 Sheets-Sheet 1

*INVENTOR.*
WILLIAM F. DURBIN

BY

*P. L. Miller*
ATTORNEY

July 22, 1958     W. F. DURBIN     2,844,269
CONTAINER

Filed Dec. 13, 1954     2 Sheets-Sheet 2

INVENTOR.
WILLIAM F. DURBIN
BY
R. L. Miller
ATTORNEY

United States Patent Office 2,844,269
Patented July 22, 1958

2,844,269
CONTAINER

William F. Durbin, Hartville, Ohio, assignor to The Goodyear Tire & Rubber Company, Akron, Ohio, a corporation of Ohio Application December 13, 1954, Serial No. 474,667

16 Claims. (Cl. 220—1)

This invention relates to a container and more particularly to a container exposed to conditions under which the container may be ruptured or punctured causing the contents to leak therefrom.

Such conditions are encountered frequently in aircraft, particularly military craft, which are subject to gunfire. As a result, if a container or tank is ruptured, the loss of fuel from the container not only presents a very dangerous fire or erosion hazard but also might be sufficient to cause a fuel shortage before the flight is completed. In many instances also, the force of an aircraft crash will rupture the fuel containers causing dangerous fire and explosion conditions. In those instances, the forces causing the tanks to rupture are of much greater magnitudes than those caused by the normal flight conditions, whether they be combat or straight flying.

Similar conditions may be encountered in some land vehicle operations and this invention will provide adequate protection in these instances. Although this invention is primarily directed to preventing appreciable loss of liquids from containers, it will satisfactorily operate in containers which confine readily flowable solid materials such as carbon black, grain and the like if the container is ruptured.

It is therefore an object of this invention to provide a relatively simple and positive means to confine the contents of a container if it should be ruptured or punctured.

Another object of the invention is to provide means that only come into operation when the container is ruptured or punctured.

A further object of the invention is to provide means that is relatively light in weight and consumes little space so as to not materially reduce the capacity of the container.

A still further object of the invention is to provide a structure that may be readily adapted to the various shapes and sizes of containers.

Another object is to provide a structure which will confine the fluids in containers with ruptures that usual structures will not confine satisfactorily.

Other objects and advantages of this invention will become apparent hereinafter as the description thereof proceeds, the novel features, arrangements and combinations being clearly pointed out in the specification as well as in the claims thereunto appended.

Figures 1, 2:
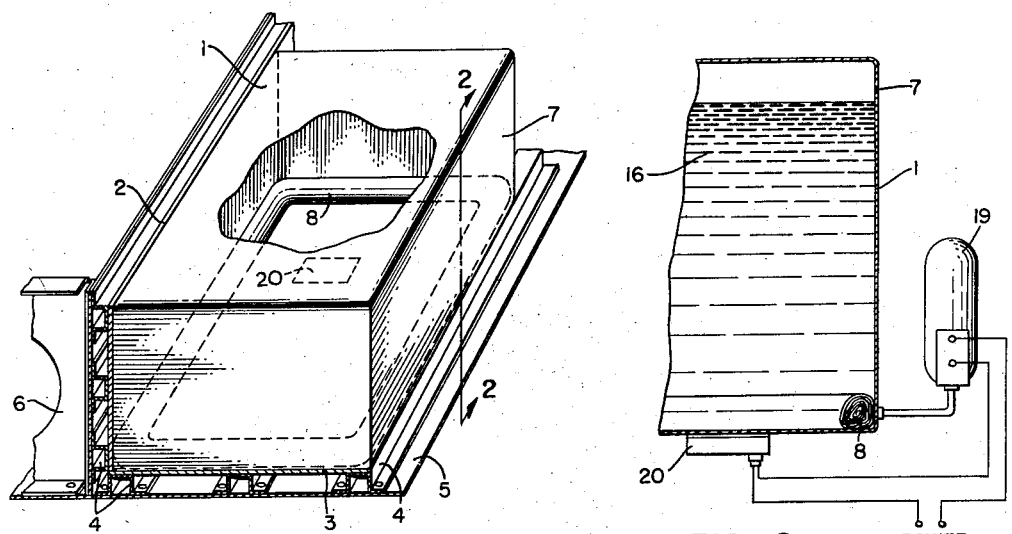
Fig. 1 is a perspective view of the invention in the normal position.
Fig. 2 is an enlarged partial section taken along lines 2—2 of Fig. 1.

The past practices in providing self-sealing containers, particularly those subjected to gunfire, have been directed primarily toward practices in which the wall of the cell when punctured or ruptured, itself closes the wound. This is usually accomplished by the material itself swelling from the effects of the fluid in the containers coming in contact with a portion of the wall structure. Modern weapons have increased the projectile size to such an extent that the openings caused thereby are of such great size that it is very difficult, if not impossible, to seal satisfactorily by the usual measures. If a seal is eventually accomplished, substantial amounts of fluid have been lost meanwhile from the container so that the fire and explosion hazards are great in addition to possible fuel shortages.

Until recently little interest has been shown in containers that include means to provide a "one shot" container, that is one that will satisfactorily confine the contents only after the first rupture or puncture, and not if subject to rupture or puncture at a later time. With the high speeds of flying now encoutnered, the probabilities of a second rupture or puncture in any individual container are very remote and means to protect against this single rupture have become practical.

Protective means of this type, of course are very advantageous also as protection in the event of a crash either of an aircraft or land vehicle. In any container which either confines valuable or flammable contents, protective means such as contemplated by this invention would be appreciated and of considerable value in the event of a rupture or puncture.

In the drawings a typical fuel container or cell 1 is shown in an aircraft installation. As illustrated wing board or backing board panels 2 and 3 are in contact with the side and bottom respectively of the container 1. Similar wing boards support the ends and the other side and bottom of the container in the complete installation. As shown inverted channel members 4 are attached to the skin 5 and rib 6 respectively of the airplane structure to provide support for the wing board panels 2 and 3. The details of this installation are used only for the purpose of representing a typical fuel cell installation.

The cell 1 may be of any of the well-known constructions, although in most instances the self-sealing structure in the wall construction is not required. The cell walls 7 may be either flexible or rigid, depending upon the particular design requirements and must be, for aircraft applications, of as light a weight construction as is consistent with satisfactory performance.

In Fig. 2 a secondary wall structure 8 is shown rolled up or collapsed in a bottom corner of the cell and extending around the container indicated by the dotted line in Fig. 1. This is the normal position of this secondary wall in the fuel cell until one of the walls 7 of the cell 1 is ruptured. It is apparent that this second wall structure 8 consumes little space in the cell and does not materially decrease the capacity of the cell.

Figures 3, 4:
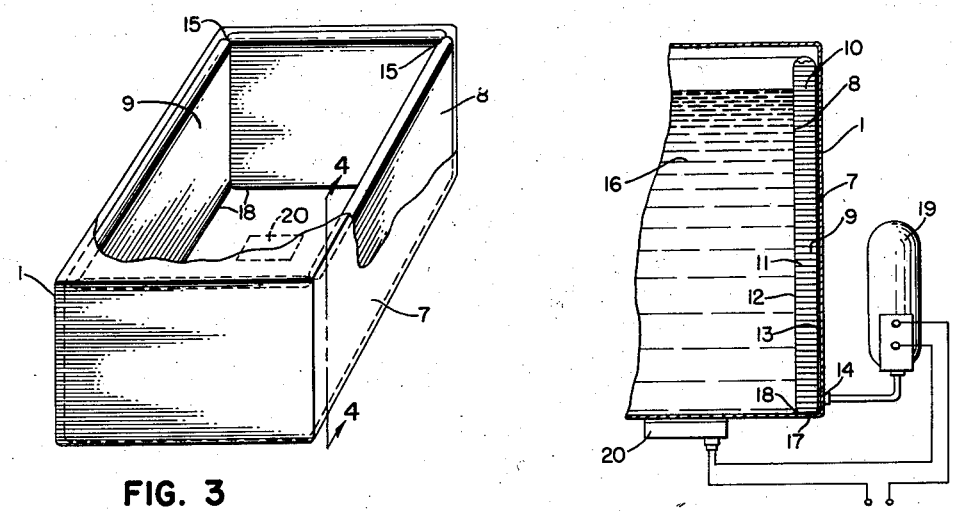
Fig. 3 is a perspective view of the invention in the operative position.
Fig. 4 is an enlarged partial section taken along lines 4—4 of Fig. 3.

In the preferred form of the invention the secondary wall 8 is in the form of a sleeve 9 formed of an inflatable fabric member or members 10 seen in Fig. 4 that substantially cover the inside of the walls 7 of the cell 1 when inflated. The inflatable members are pneumatic chambers formed of a substantially liquid-impervious coated double ply fabric having a plurality of inextensible drop or tie threads 11 woven into each of the two plies 12 and 13 of fabric so that when the chamber is inflated the fabric plies 12 and 13 are in spaced parallel relation to each other. This type of fabric is well known and commercially available. An inlet valve 14 of the usual construction is provided so that inflation can be made when desired. The sleeve 9 can be formed of a single pneumatic chamber in which the plies of the fabric are sewn together throughout the height of the sleeve at the point 15 the sleeve 9 is to be folded or bent in order to conform to the configuration of the container when inflated. The stitching should be of such a nature so as to allow the air to pass therethrough readily in order that the chamber may be readily inflated as a single unit when desired.

Alternately, a series of individual chambers may be formed, then joined together according to any of the well-known practices. In this construction, preferably a manifold system, not shown, should be provided so that each of the chambers will be simultaneously inflated. If the details of a particular structure make it feasible to have one or more separate chambers for the sleeve, then selective inflation of one or more of the chambers may be provided. One manner of accomplishing this is by the use of a manifold and valve control system.

Under the usual operating conditions the sleeve 9 is in the collapsed or rolled-up condition, preferably in the lower corners of the fuel cell, and serves no particular purpose while in this position. If a rupture occurs in one or more of the cell walls so that the fluid 16 begins to leak from the container, the sleeve member is then inflated and upon inflation the sleeve 9 is raised to form a secondary wall around the inside of the container wall, as best illustrated in Fig. 3. This secondary wall 8 then stops the further flow of fluid 16 from the rupture in the primary container wall 7 and only the fluid 16 that has escaped prior to the positioning of the sleeve, and a small amount of which may be trapped between the secondary and primary walls, is lost. The total amount of lost fuel is small. Preferably the lower end 17 of the sleeve 9 is fastened to the container with a liquid-tight seam 18 so that no fluid can escape through the juncture of the end of the sleeve and the container.

In either of these constructions the chamber or chambers may be constructed of fabric layers or plies that have been treated to make them substantially fluid impervious. A series of tie elements may be fastened respectively to each of the plies so that the plies upon inflation will assume a generally spaced parallel relation. Such fabric structures are well known in the art and no details of the construction need be shown. The chamber or chambers are used in the same manner as previously described.

Automatic means to inflate the sleeve preferably are used, particularly with cells used in military aircraft which are subject to gun fire. One such operative automatic inflating means is best illustrated in Figs. 2 and 4 in which a cylinder 19 of a compressed gas, such as carbon dioxide or nitrogen, is connected to the valve inlet 14 of the sleeve.

In order to operate the inflating means, preferably, a pressure-sensitive switch 20 is mounted adjacent to the container, preferably the bottom, in such a manner as to be activated by the pressure surge caused in the fluid by the passage of a projectile through the fluid. This switch is attached to a source of electrical energy, not shown, which, when activated, actuates the release mechanism on the cylinder of compressed gas to release the gas therefrom so as to inflate the sleeve inside the container. The pressure switch can be set so as to be triggered only by relatively high pressures, such as occur when a projectile passes through the contents of the tank or in the event of a crash of the aircraft or other vehicle.

Figure 5:
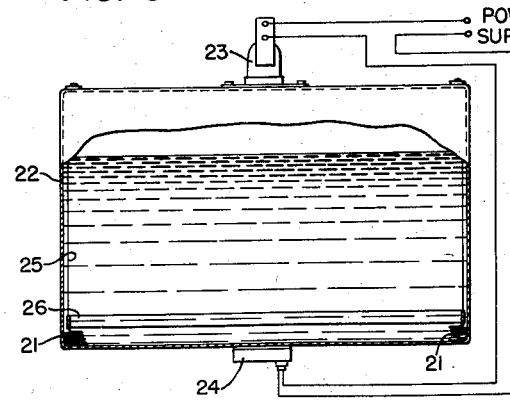
Fig. 5 is a sectional view of a modification of the invention.
Figure 6:
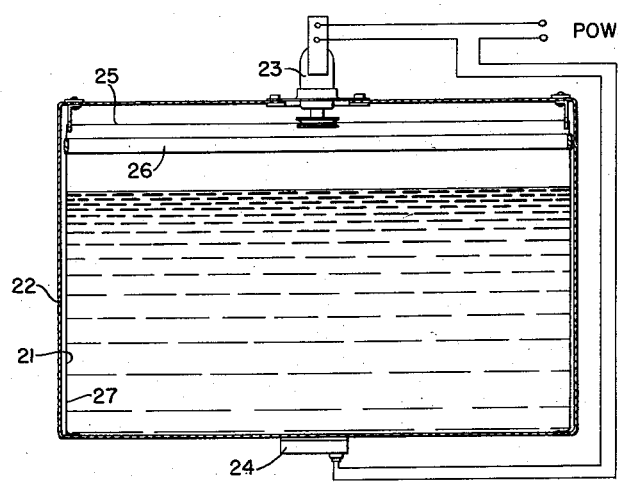
Fig. 6 is a detailed sectional view of the modification shown in Fig. 5.

In the modification shown in Figs. 5 and 6 a sleeve 21, preferably formed of light-weight fabric, is extended from the position shown in Fig. 5 to that shown in Fig. 6 when a rupture occurs in the container wall 22. As shown in Fig. 6, a spring-driven motor 23 with an electrical trigger release is mounted over the container. The trigger is actuated, for example by a pressure-sensitive switch 24 when a rupture occurs such as previously described. The motor winds up simultaneously lines 25 attached to a frame member 26 attached to the top of the sleeve so that the sleeve 21 is raised uniformly around the inside of the wall. The bottom of the sleeve is attached to the cell with a liquid-tight joint. A further loss of fluid is prevented after the sleeve is raised because the sleeve forms a secondary liquid-confining container 27, Fig. 6, with undamaged walls.

Figure 7:
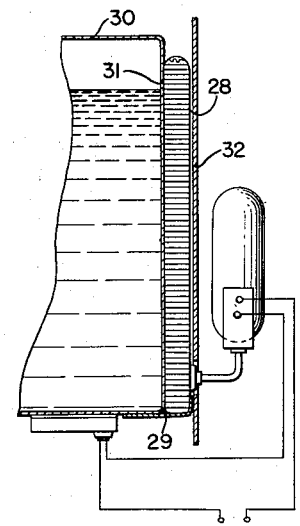
Fig. 7 is a partial section of another modification of the invention.
Figure 8:
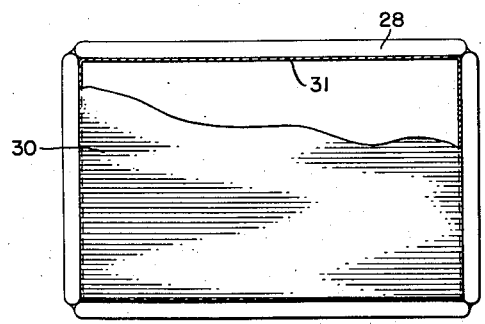
Fig. 8 is a plan view of the modification shown in Fig. 7.

In the modification shown in Figs. 7 and 8, a sleeve 28 of inflatable fabric, similar to that described in connection with Figs. 1–4, is shown. The sleeve is attached with a liquid-tight seam 29 to the outside of the container 30 so that, when extended, it lies between the container wall 31 and the supporting structure 32 for the container. Upon rupture of the container the sleeve is inflated and forms a complete undamaged wall around the outside of the container. The fluid is confined within the inflated sleeve and further loss is prevented.

In any of the modifications, other triggering devices may be used to extend the secondary walls or container into position in the event one or more walls are ruptured. For example, a switch sensitive to the fluid in the container would be positioned so that it would be contacted by the fluid leaking from the container which in turn would trigger the switch to activate secondary wall extending means. The particular means used to activate the secondary wall or container structure extending means into the operative position may be selected to fit the requirements of the particular installation.

It is apparent from the description of the invention that the invention in its various modifications provides an undamaged secondary member or members which are positioned after the primary container is ruptured. In each modification the sleeve or elements are raised into position, although they can be moved otherwise, such as lowered if desired. It is also possible to activate the sleeve-operating mechanism by hand, for example one of the plane personnel could throw a switch which would cause the sleeve to be moved into position.

An additional element can be provided that will extend across the bottom of the container in the event of rupture. In this event it will sometimes be necessary to provide auxiliary restricting or guide means that will not allow the member extending across the bottom to be floated up by the fluid in the container. If this type of structure is used a secondary open-top container is formed in the original container so that a complete auxiliary liquid-confining container is formed after rupture of the primary container and appreciable loss of fluid is prevented.

In operation, the secondary wall or container structure preferably is rolled or collapsed adjacent the bottom of the container for normal operation. It may be necessary to provide restraining means to hold in place and prevent the fluid from floating the structure so as to possibly interfere with the normal operation of the container. For example, low tensile-strength cord may be tied around the roll and would be broken readily when extending the wall structure if the container should be ruptured. In the inflatable chamber-type of secondary wall, a vacuum attached to the valve assists in rolling or collapsing the walls so that they occupy as small a space as possible in the unextended position.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A closed container for confining fluid therein including means to prevent appreciable loss of the confined fluid from the container if a sudden rupture occurs in one or more of the container walls, the container normally confining the fluid therein until a rupture occurs said means comprising a fluid-impervious flexible member normally in the unextended position and means to extend the flexible member adjacent to and in substantial contact with at least the container wall in which the rupture occurs and to substantially cover said wall, thereby providing an undamaged fluid-confining wall structure to cover the ruptured wall and prevent further loss of fluid from the container.

2. A closed container for confining fluid therein including means to prevent appreciable loss of the confined fluid from the container if a sudden rupture occurs in one or more of the container walls, the container normally confining the fluid therein until a rupture occurs the said means comprising a fluid-impervious flexible sleeve member normally in the unextended position, of a size when extended, to cover at least a substantial portion of each side wall of the container when extended, and means to extend said sleeve member adjacent to and in substantial contact with the container walls when the container is ruptured to provide an undamaged wall structure to confine the fluid and prevent further loss of fluid from the container.

3. A closed container for confining liquids therein including means to prevent appreciable loss of the confined liquid from the container if a sudden rupture occurs in one or more of the container walls, the container normally confining the fluid therein until a rupture occurs comprising a liquid-impervious flexible sleeve member normally in the unextended position of a size when extended, to cover at least a substantial portion of the side walls of the container when extended, one end of said sleeve being attached to the container adjacent the bottom thereof to anchor said sleeve in position, and means to raise said sleeve member to the extended position adjacent to and in substantial contact with the container wall when one or more walls are ruptured to substantially cover said walls and provide an undamaged second wall structure to confine the liquid and prevent further loss of fluid from the container.

4. A closed container for confining liquids therein including means to prevent appreciable loss of the confined liquid from the container if a sudden rupture occurs in one or more of the container walls, the container normally confining the fluid therein until a rupture occurs comprising a liquid-impervious flexible sleeve member normally in the unextended position of a size when extended, to cover at least a substantial portion of the side walls of the container when extended, one end of said sleeve being continuously joined to the container adjacent the bottom thereof to anchor said sleeve in position and prevent liquid from passing through the juncture of the sleeve and container, and means to raise said sleeve member to the extended position adjacent to and in substantial contact with the container wall when one or more walls are ruptured to substantially cover said walls and provide an undamaged second wall structure to confine the liquid and prevent further loss of fluid from the container.

5. A closed container for confining liquids therein including means to prevent appreciable loss of the confined liquid from the container if a sudden rupture occurs in one or more of the container walls, the container normally confining the fluid therein until a rupture occurs said means comprising a liquid-impervious flexible member normally in the unextended position, trigger means adjacent one of the container walls activated if a rupture occurs in one of the container walls and means actuated by said trigger means to extend the flexible member adjacent to and in substantial contact with the container wall and to substantially cover at least the container wall in which the rupture occurs, thereby providing an undamaged liquid confining wall structure to cover the ruptured wall and prevent further loss of fluid from the container.

6. A closed container for confining liquids therein including means to prevent appreciable loss of the confined liquid from the container if a sudden rupture occurs in one or more of the container walls, the container normally confining the fluid therein until a rupture occurs said means including at least one liquid-impervious pneumatic chamber flexible member normally in the unextended position, said flexible member comprising at least one pneumatic chamber having two plies of substantially liquid-impervious fabric disposed in spaced opposed relation to each other in the inflated position with said plies being joined together by a plurality of substantially inextensible tie threads which a woven into each of the plies, said flexible member normally being in the uninflated condition, trigger means adjacent one of the container walls activated if a rupture occurs in one of the container walls, and means actuated by said trigger means to extend the flexible member adjacent to and in substantial contact with the container wall and covering at least a substantial portion of the container wall in which the rupture occurs, thereby providing an undamaged liquid-confining wall structure to cover the ruptured wall and prevent further loss of fluid from the container.

7. A closed container for confining liquids therein including means to prevent appreciable loss of the confined liquid from the container if a sudden rupture occurs in one or more of the container walls, the container normally confining the fluid therein until a rupture occurs said means including a liquid-impervious flexible sleeve member normally in the unextended position, said sleeve member comprising at least one pneumatic flexible chamber having two plies of substantially liquid-impervious fabric disposed in spaced opposed substantially parallel relation to each other in the inflated position, with said plies being joined together by a plurality of substantially inextensible tie elements, said sleeve member being of a size to cover at least a substantial portion of the side walls of the container when extended, and means to extend said member adjacent to and in substantial contact with the container wall by inflating said member when the container is ruptured to provide an undamaged wall structure to confine the liquid and prevent further loss of fluid from the container.

8. A closed container for confining liquids therein including means to prevent appreciable loss of the confined liquid from the container if a sudden rupture occurs in one or more of the container walls, the container normally confining the fluid therein until a rupture occurs, said means comprising a liquid-impervious flexible sleeve member normally in the unextended position of a size to cover at least the side walls of the container when extended, trigger means adjacent one of the container walls activated when a rupture occurs in the container and means actuated by said trigger means to extend said sleeve member adjacent to and in substantial contact with the container wall when the container is ruptured to substantially cover said wall and provide an undamaged wall structure to confine the liquid and prevent further loss of fluid from the container.

9. A closed container for confining liquids therein including means to prevent appreciable loss of the confined liquid from the container if a sudden rupture occurs in one or more of the container walls, the container normally confining the fluid therein until a rupture occurs, said means comprising a liquid-impervious flexible sleeve member normally in the unextended position of a size to cover at least the side walls of the container when extended, one end of said sleeve being attached to the container adjacent the bottom thereof to anchor said sleeve in position, trigger means adjacent one of the container walls activated when a rupture occurs in the container, and means actuated by said trigger means to raise said sleeve member adjacent to and in substantial contact with the container wall when the container is ruptured to provide an undamaged wall structure to confine the liquid and prevent further loss of fluid from the container.

10. A closed container for confining liquids therein including means to prevent appreciable loss of the confined liquid from the container if a sudden rupture occurs in one or more of the container walls, the container normally confining the fluid therein until a rupture occurs, said means comprising at least one pneumatic chamber flexible member having two plies of substantially liquid-impervious fabric disposed in spaced opposed parallel relation to each other in the inflated position with said plies being joined together by a plurality of substantially inextensible tie threads which are woven into each of the plies, said flexible member normally being in a collapsed position adjacent the lower corners of the container and of a size when inflated to substantially cover at least the side walls of the container, trigger means adjacent one wall of the container activated when a wall of the container is ruptured, and inflating means actuated by said trigger means to inflate and extend said flexible member adjacent to and substantially in contact with the walls to substantially cover the side walls of the container when one or more container walls are ruptured and prevent further loss of fluid from the container.

11. A closed container for confining liquids therein including means to prevent appreciable loss of the confined liquid from the container if a sudden rupture occurs in one or more of the container walls, the container normally confining the fluid therein until a rupture occurs said means comprising at least one pneumatic chamber flexible member having two plies of substantially liquid-impervious fabric disposed in spaced opposed parallel relation to each other in the inflated position with each of said plies being joined together by a plurality of substantially inextensible tie threads which are woven into each of the plies, said flexible member normally being in a collapsed position adjacent to and attached to the lower inside corners of the container and of a size when inflated to substantially cover the inside of the side walls of the container, pressure-sensitive switch trigger means adjacent one wall of the container activated when a wall of the container is ruptured, and inflating means actuated by said pressure switch trigger means to inflate and extend said flexible member adjacent to and in substantial contact with the walls so as to substantially cover the side walls of the container when one or more container walls are ruptured and prevent further loss of fluid from the container.

12. The combination with a closed container for confining liquids therein of means to prevent the appreciable loss of liquid if a wall of the container should be suddenly ruptured the container normally confining the fluid therein until a rupture occurs, said means comprising a closure member normally positioned adjacent the bottom of the container in a collapsed position, said closure member when extended substantially covering the side walls of the container, trigger means activated when the rupture occurs, and means actuated by said trigger means to cause said closure member to be extended adjacent to and in substantial contact with the side walls of the container so as to cover at least a substantial portion thereof to prevent further flow of the liquid from the rupture.

13. A closed container for confining liquids therein including means to prevent appreciable loss of the confined liquid from the container if a sudden rupture occurs in one or more of the container walls, the container normally confining the fluid therein until a rupture occurs said means comprising a liquid-impervious flexible member normally in a collapsed position adjacent the lower corners of the container and of a size when extended to cover at least a substantial portion of the side walls of said container, a pressure-sensitive switch adjacent one wall of the container activated when a wall of the container is ruptured, and means actuated by said pressure switch to extend said flexible member adjacent to and in substantial contact with the inner side of the side walls of the container when one or more container walls are ruptured and substantially cover the same, whereby secondary container side walls are positioned adjacent the inside of the container side walls to confine the liquid and prevent further loss of fluid from the container.

14. A closed container for confining liquids therein including means to prevent appreciable loss of the confined liquid from the container if a sudden rupture occurs in one or more of the container walls, the container normally confining the fluid therein until a rupture occurs said means comprising a liquid-impervious flexible member open-topped secondary container normally in a collapsed position adjacent the bottom of the container and of a size when extended to substantially cover at least the side walls of said container, a pressure-sensitive switch adjacent one wall of the container activated when a wall of the container is ruptured, and means actuated by said pressure switch to extend said flexible member adjacent to and in substantial contact with the inner side of the side walls of the container when one or more container walls are ruptured, whereby secondary container side walls are positioned adjacent the inside of the container side walls to confine the liquid and prevent further loss of fluid from the container.

15. A closed container for confining liquids therein including means to prevent appreciable loss of the confined liquid from the container if a sudden rupture occurs in one or more of the container walls, the container normally confining the fluid therein until a rupture occurs said means comprising a liquid-impervious flexible member open-topped secondary container normally in a collapsed position adjacent to and attached to the bottom of the container and of a size to substantially cover at least the side walls of said container when extended, a pressure-sensitive switch adjacent one wall of the container activated when a wall of the container is ruptured, and means actuated by said pressure switch to extend said flexible member adjacent to and in substantial contact with the inner side of the side walls of the container when one or more container walls are ruptured, whereby secondary container side walls are positioned adjacent the inside of the container side walls to confine the liquid and prevent further loss of fluid from the container.

16. A liquid closed container that may be subject to sudden rupture from gunfire or crash pressures causing loss of the liquid therefrom, the container normally confining the fluid therein until a rupture occurs, said container comprising in combination therewith a closure member normally positioned in the unextended position adjacent the container walls so as to avoid rupture by the rupturing force, trigger means actuated by the pressure surge caused in the liquid by the rupturing force, and actuating means activated by said trigger means to extend said closure member adjacent to and in substantial contact with the container walls to cover the rupture whereby further flow of the liquid through the rupture is prevented.

References Cited in the file of this patent

UNITED STATES PATENTS

| | | |
|---|---|---|
| 2,387,598 | Mercier | Oct. 23, 1945 |
| 2,519,393 | Noyes | Aug. 22, 1950 |
| 2,609,118 | Cattaneo | Sept. 2, 1952 |
| 2,611,512 | Fashay | Sept. 23, 1952 |
| 2,653,780 | Peppersack | Sept. 29, 1953 |
| 2,654,553 | Noon et al. | Oct. 6, 1953 |

FOREIGN PATENTS

| | | |
|---|---|---|
| 56,638 | France | July 23, 1952 |